Oct. 3, 1939.  L. D. SOUBIER  2,174,930
METHOD OF AND APPARATUS FOR PRODUCING HOLLOW GLASS ARTICLES
Filed Feb. 1, 1937  6 Sheets-Sheet 2
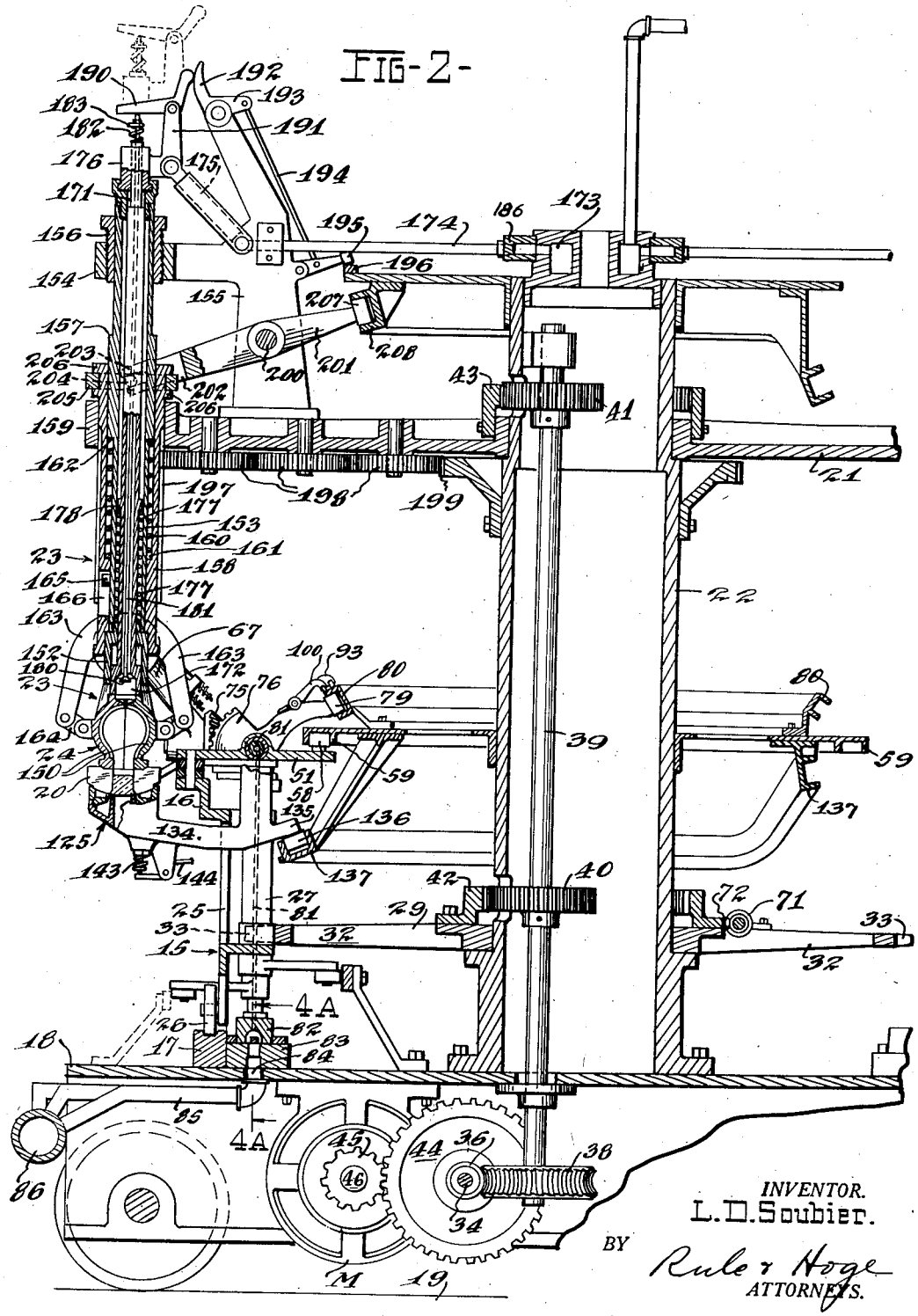
FIG-2-
INVENTOR.
L.D.Soubier.
BY Rule & Hoge
ATTORNEYS.

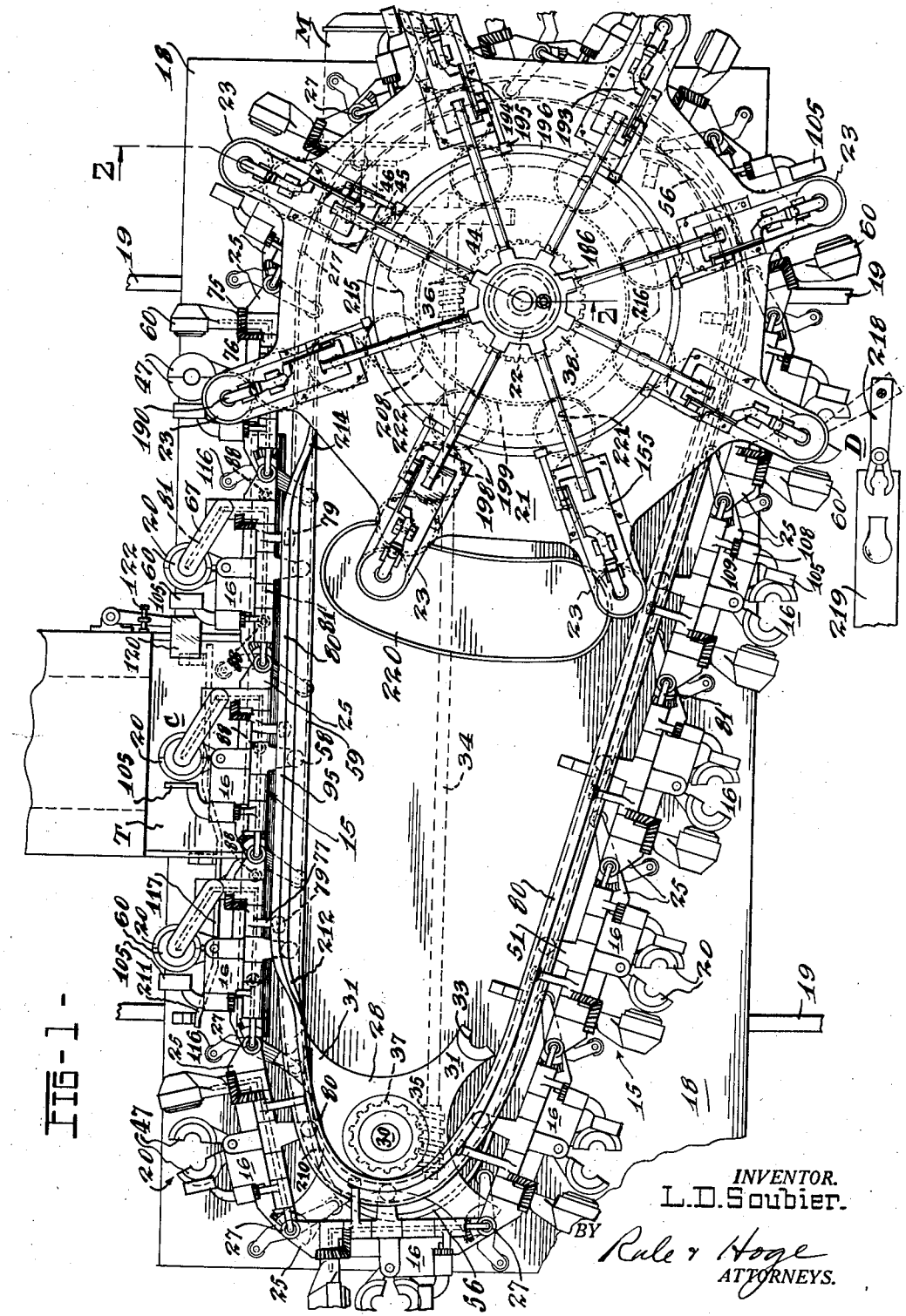

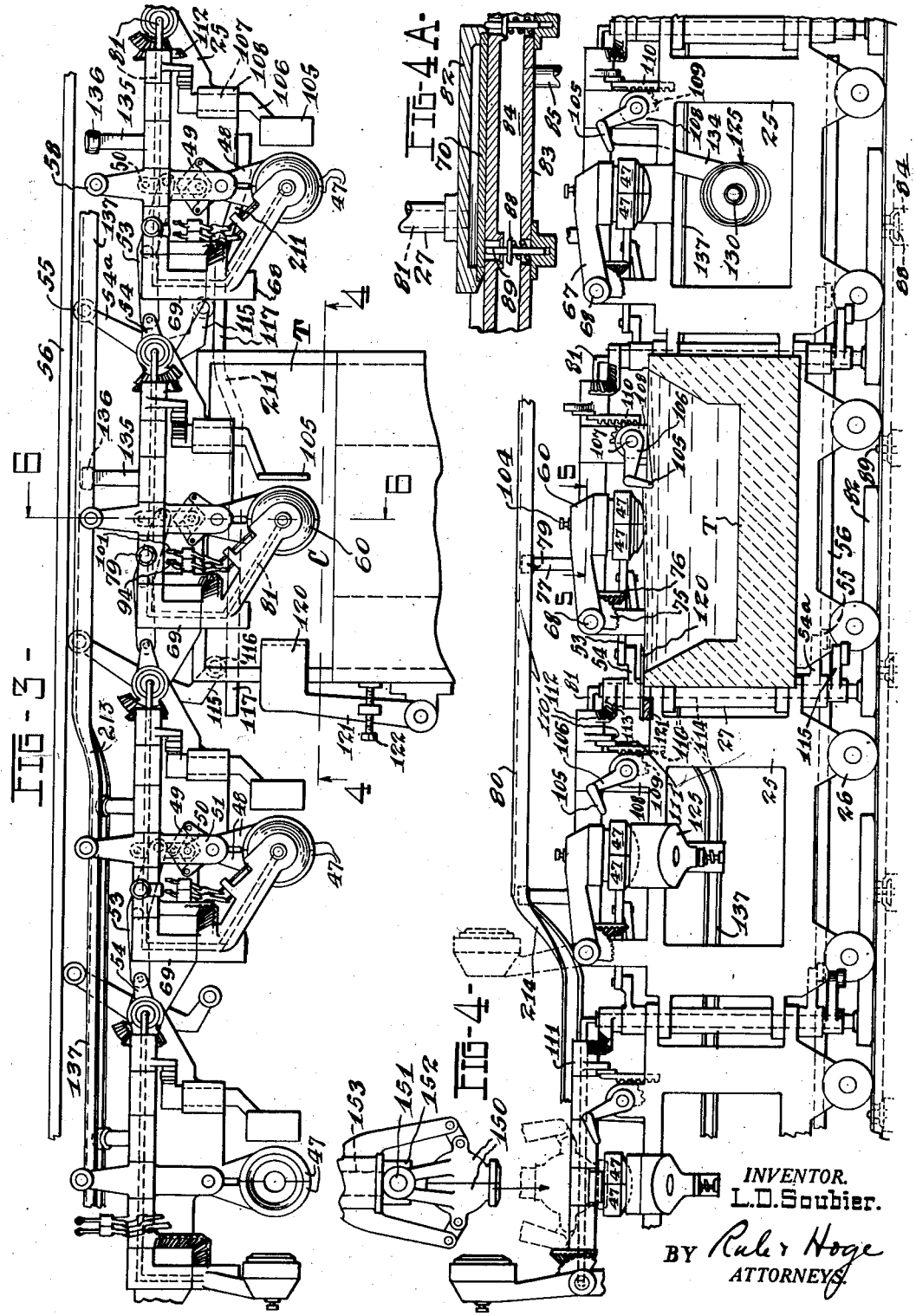

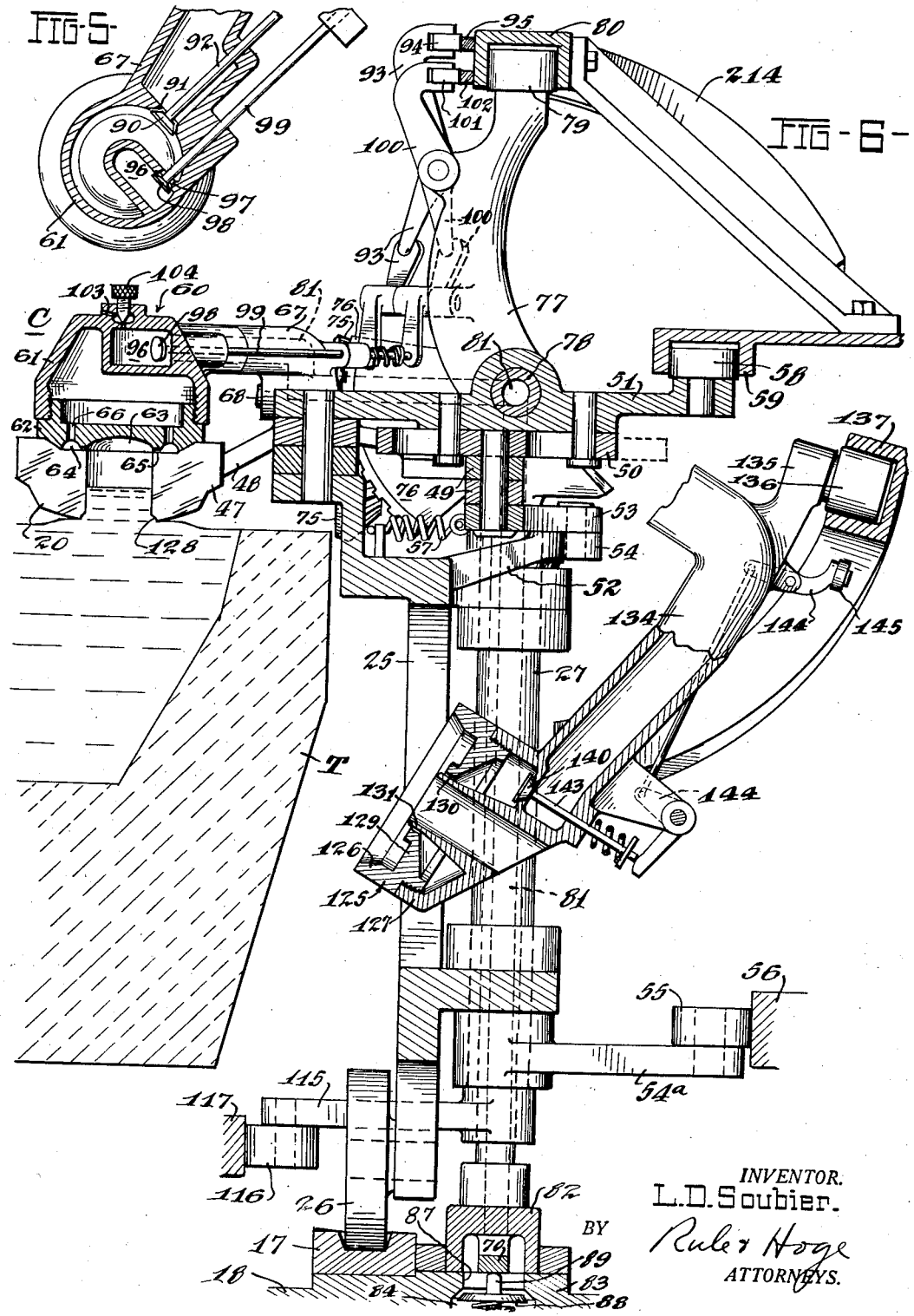

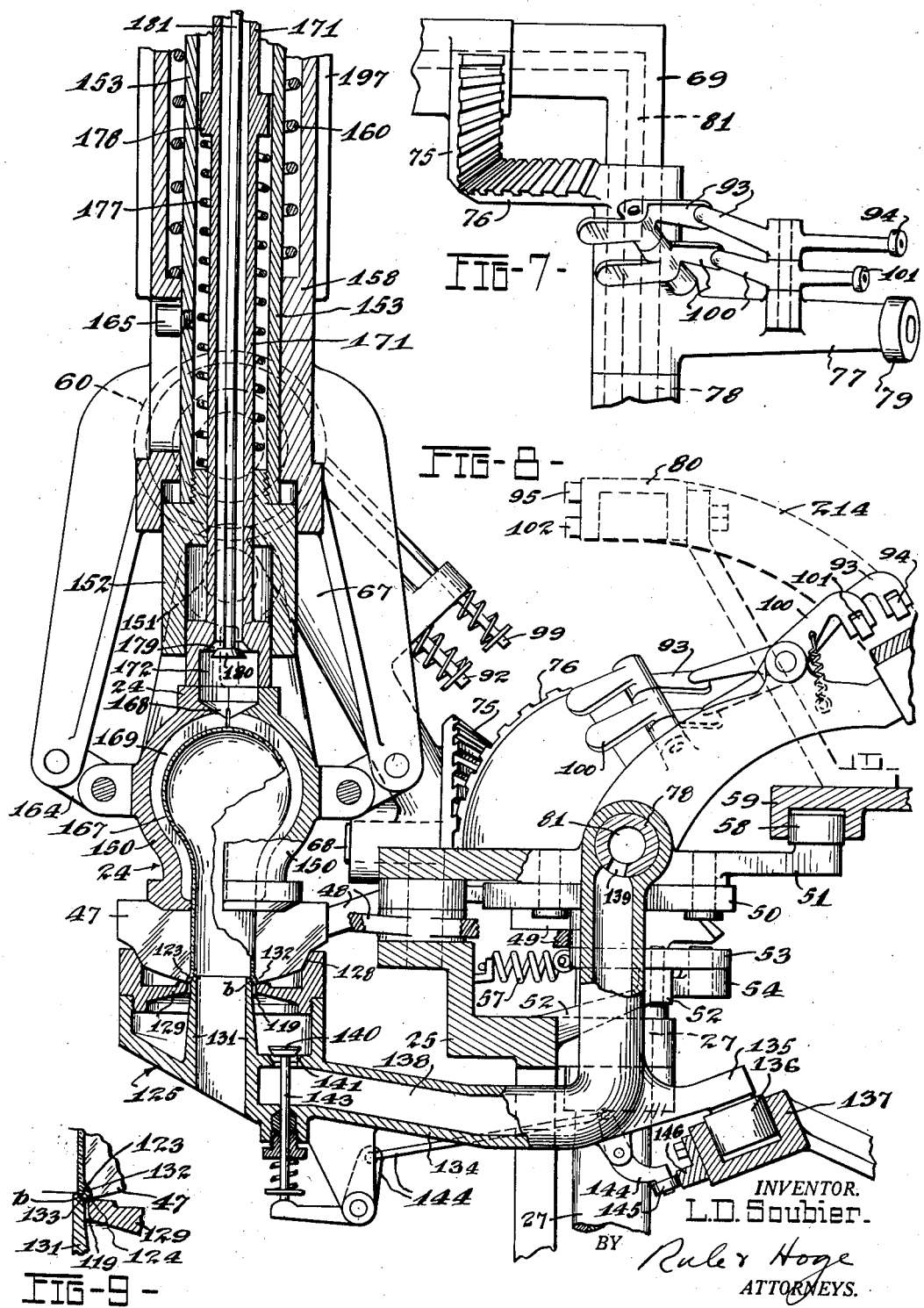

Oct. 3, 1939.    L. D. SOUBIER    2,174,930
METHOD OF AND APPARATUS FOR PRODUCING HOLLOW GLASS ARTICLES
Filed Feb. 1, 1937    6 Sheets-Sheet 6
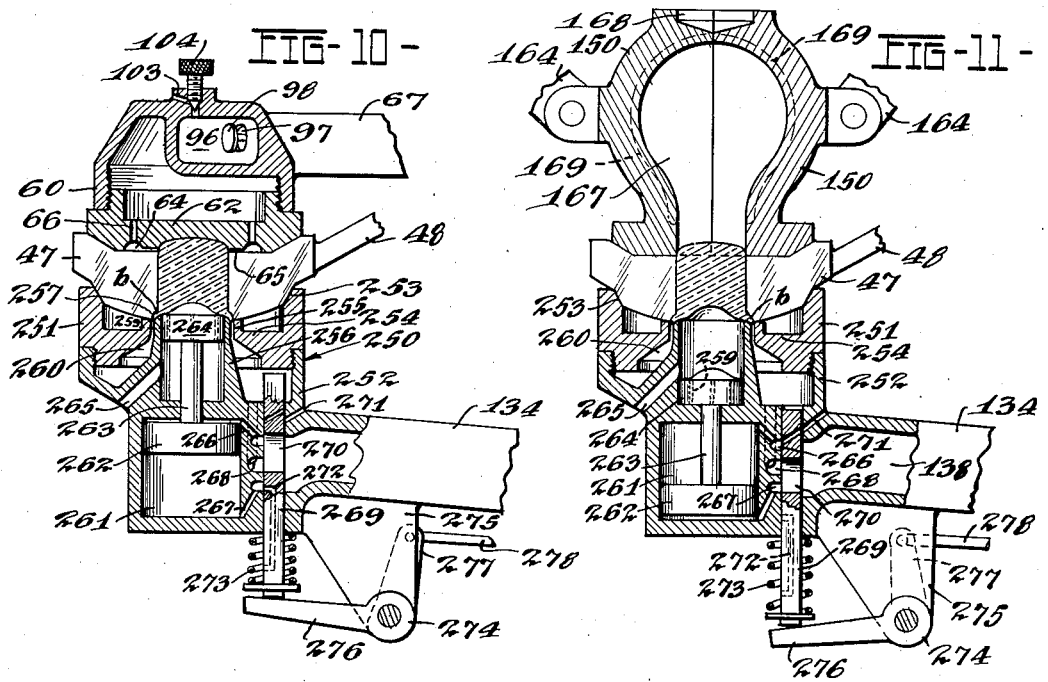
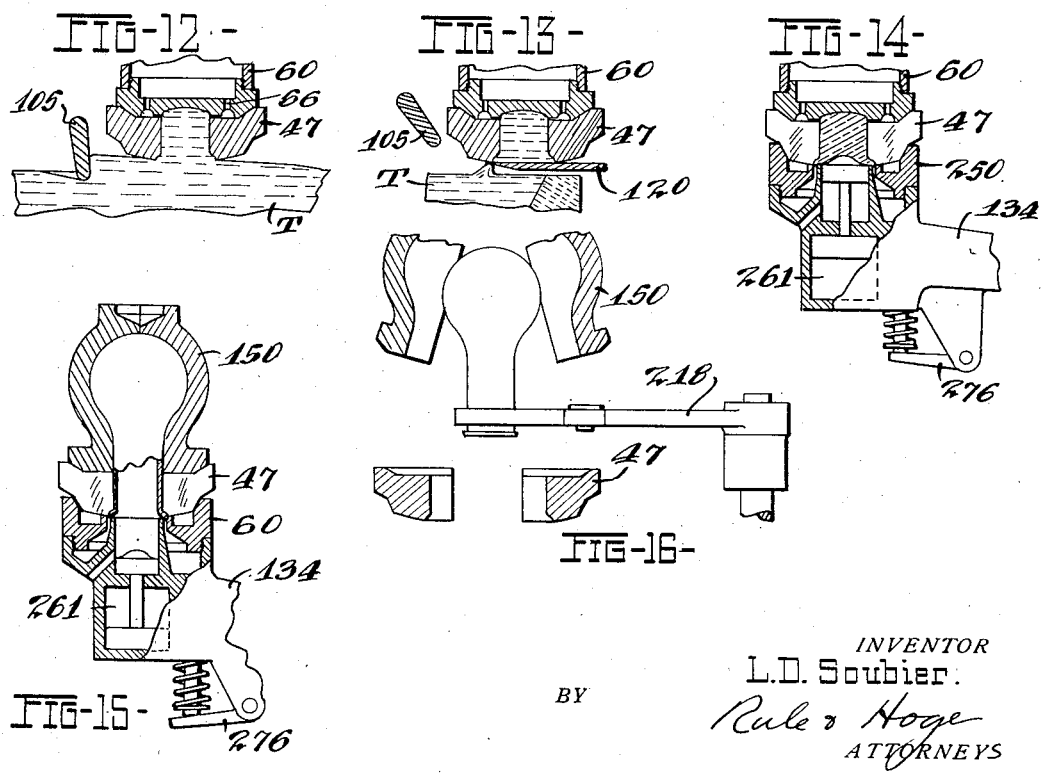
INVENTOR
L. D. Soubier
BY
Rule & Hoge
ATTORNEYS Patented Oct. 3, 1939

2,174,930

UNITED STATES PATENT OFFICE 2,174,930

METHOD OF AND APPARATUS FOR PRODUCING HOLLOW GLASS ARTICLES

Leonard D. Soubier, Toledo, Ohio, assignor to Owens-Illinois Glass Company, a corporation of Ohio Application February 1, 1937, Serial No. 123,362

37 Claims. (Cl. 49—5)

The improved method of and apparatus for producing hollow glass articles is, for illustrative purposes, embodied in a machine designed to produce incandescent lamp bulbs. The principles of the invention however are applicable to the manufacture of other glass articles, such for example as tumblers.

The present invention is designed as an improvement over the apparatus shown and described in my co-pending application S. N. 738,459, filed August 4, 1934, for a Method of and apparatus for producing hollow glass articles and is a continuation in part thereof.

Heretofore, in the manufacture of lamp bulbs, in order that there may be sufficient glass available for proper and uniform expansion in the finishing mold, the apparatus employed has been designed to reckon with the inclusion of a quantity of excess glass at the neck of the bulb, such glass representing glass in excess of that required to produce the bulb and being in the form of a tubular extension of the neck, commonly referred to as the "moile." The inclusion of such a "moile" presents manufacturing difficulties and ordinarily requires that specially constructed molds or other holding devices be employed during the fabricating process. In addition, the apparatus must make provision for a burning-off operation to remove the "moile" and provision must be made so that the "moile" may find its way to a "cullet pile" and ultimately back to the furnace for remelting. Since the quantity of glass contained in each "moile" is approximately 15% more than the glass actually embodied in the finished bulb, elimination of this "moile" altogether from the manufacturing process would, and by the present invention does, effect a material reduction in the manufacturing costs, while at the same time greatly simplifying the manufacturing operations.

The principal object of the present invention is to provide a method of and an apparatus for forming incandescent lamp bulbs by means of which measured charges of molten glass are withdrawn and severed from a supply body thereof and the entire mass of each individual charge utilized in the formation of a bulb, thus eliminating "moiles" altogether in the manufacturing process. In carrying out this object, the invention contemplates the provision of a gathering or neck mold (these terms being used interchangeably) and a finishing mold, the former being designed to hold the exact quantity of molten glass required to produce the finished bulb and bulb neck. The measured charge is drawn into the neck mold from a supply body of molten glass and is severed from the supply body. Subsequently, the soft central portion or core of the charge is transferred to the finishing mold and is expanded to its final shape by the application of differential air pressure to the opposite ends of the charge in the mold.

Yet another object of the invention is to provide an apparatus of the type set forth above in which there is provided a gathering mold and a finishing mold, together with means for gathering measured charges of molten glass in the former and means for transferring a portion of said charges to the latter to produce a bulb, in which means is provided for compacting and shaping the measured charge in the gathering mold prior to the transferring operation to improve the quality of the finished article.

A still further object of the invention is to provide an apparatus of the type set forth above in which means is associated with the gathering mold for drawing and chilling a marginal bead and for confining the same during the transferring operation, thus not only forming the required bead for the finished article, but in addition, providing a retaining means for maintaining the neck portion of the article in the gathering mold during the expansion of the article in the finishing mold.

The provision of an apparatus which, in the gathering, compacting, bead forming, and expanding operations, utilizes only differential pressures between sub-atmospheric or vacuum pressure and atmospheric pressure for its operations, thus eliminating the use of air under pressure; the provision of an apparatus in which the various phases of operation just mentioned follow each other with the least possible lapse of time between each phase, thus resulting in a thin walled article; and the provision of an apparatus which is capable of relatively high speed, thus resulting in increased production, are further desirable features that have been borne in mind in the production and development of the present invention.

In the accompanying drawings forming part of this specification:

Fig. 1 is a top plan view of an apparatus for producing incandescent lamp bulbs manufactured in accordance with the principles of the present invention;

Fig. 2 is a sectional view taken substantially along the line 2—2 of Fig. 1;

Fig. 3 is a fragmentary top plan view of a portion of a chain or series of neck mold units employed in connection with the present invention and showing the same in the relation they bear to a gathering trough from which charges of molten glass are withdrawn to produce the finished bulbs;

Fig. 4 is a fragmentary sectional view of the disclosure made in Fig. 3, a portion of the view being taken substantially along the line 4—4 of Fig. 3;

Fig. 4A is a sectional view taken substantially along the line 4A—4A of Fig. 2;

Fig. 5 is a fragmentary enlarged sectional view taken through a suction head employed in connection with the present invention along the line 5—5 of Fig. 4;

Fig. 6 is a sectional view taken substantially along the line 6—6 of Fig. 3. In this view, certain parts are broken away to more clearly reveal the nature of the invention;

Fig. 7 is a fragmentary plan view of a portion of a valve controlling instrumentality employed in connection with the present invention;

Fig. 8 is a fragmentary view, partly in section and partly in side elevation, of a finishing mold unit, a neck mold unit, and a bead forming suction head employed in connection with the present invention and showing the relation these parts bear to each other during the bead forming and blowing operation;

Fig. 9 is an enlarged fragmentary vertical sectional view taken through the neck mold and bead forming suction head and illustrating the manner in which the bead on the base of the finished bulb is formed;

Fig. 10 is a fragmentary side elevation, partly in vertical section, showing a modified form of bead forming suction head in operative engagement with a neck mold during the compacting of the gathered charge;

Fig. 11 is a fragmentary view similar to Fig. 10 showing the position of the parts immediately prior to expansion of the charge into the finishing mold; and Figs. 12, 13, 14, 15, and 16 are fragmentary side elevational views, partly in section and diagrammatic in their representation, illustrating a sequence of operations that are carried out in the manufacture of lamp bulbs in accordance with the principles of the present invention.

The machine involves in its general organization an endless series 15 of mold groups, the individual mold carrying units 16 of which are connected together in endless fashion to provide a conveyor. The units 16 or mold groups are tractionally supported upon an endless track 17 mounted upon a wheeled rectangular platform or base 18 which is in turn tractionally supported upon tracks 19 for movement toward and away from a gathering trough T containing a supply body of molten glass.

Each mold unit 16 has associated therewith a two-part separable gathering or neck mold 20 which conforms in shape to the shape of a portion of the finished article and into which mold charges of glass are gathered by suction. When the wheeled platform or base 18 is in its innermost position adjacent the stationary gathering trough T, movement of the series of mold groups 16 in the endless path provided by the track 17 brings the gathering or neck molds one at a time to a charging position (Fig. 1) over the trough T at a charging station C.

Supported upon a rotary mold carriage 21 which is mounted for rotation about a central stationary vertical column 22 is an annular series of mold groups, each individual unit 23 of which has associated therewith a body or finishing mold 24. The central column 22 is supported upon the platform or base 18 within the enclosure provided by the endless track 16 and, as will presently be described in detail, the neck mold units 15 are so guided in their endless movement around the column 22 in synchronism with the movement of the body mold units 23 that the mold units 15 and 23 are presented to each other in pairs throughout an arcuate portion of the path of movement of the body mold units 23 about the central column 22. During such register of the neck mold units 16 and the body mold units 23, the neck molds 20 are brought into register and contact with the body molds 24 whereupon the soft central portion or core of the mold charge that has been drawn into the neck mold by suction is forced into the body mold and expanded to the shape of said mold. Preferably the body molds 24 are of the paste mold type and are rotated about their vertical axes for a predetermined period of time following the transfer of the glass thereto to produce a seamless article. It is within the spirit of the invention to utilize a partible mold which is held against rotation in the event that a seamless article is not particularly specified or desired in the manufacture.

Referring now to Figs. 1, 2 and 4, each neck mold unit 16 includes a unitary rectangular frame-like structure 25 which constitutes the main body member of the unit. The members 16 are supported on the track 17 by means of wheels 26 and are connected together in endless fashion by means of hollow hinge pins 27, each of which, in addition to forming the means by which the adjacent mold units 16 are held together, constitutes an element of a neck mold actuating mechanism, the details of which will be fully described hereinafter. Movement of the series of neck mold units 16 which constitute the conveyor 15 in the path provided by the track 17 in synchronism with the rotary movement of the mold carriage 21 is obtained by means of a pair of conveyor wheels 28 and 29 which are driven in unison and in timed relation to the movement of the mold carriage 21. The conveyor wheels 28 and 29 (Figs. 1 and 2) are formed with a series of radially extending arms 31 and 32 respectively, the outer ends of which are arcuately bifurcated as at 33 for engagement with the vertically extending hinge pins 27 in the medial regions thereof to propel the conveyor 15 in its endless path. The conveyor wheel 28 is rotatably mounted upon a vertical shaft 30 which is supported upon the platform 18, while the conveyor wheel 29 is rotatably mounted upon the column 22. An elongated drive shaft 34 extends longitudinally of the conveyor 15 beneath the platform 18 and a pair of worms 35 and 36, mounted upon the shaft 34 adjacent its ends, mesh with worm gears 37 and 38, the former of which is formed on the conveyor wheel 28 and the latter of which is mounted upon a vertical shaft 39 (Fig. 2) that projects through the platform 18 and into the column 22 and drives the conveyor wheel 29 and mold carriage 21 in unison. The driving connections for the conveyor wheel 29 and mold carriage 21 consist of a pair of gears 40 and 41 which are mounted upon the shaft 39 and which project through the column 22 and mesh with ring gears 42 and 43 which surround the column 22 and are secured thereto. The gear 42 is adjustable on the column 22 by means of a manually operable worm 71 which meshes with a worm gear 72 formed on the gear 42. The drive shaft 34 is operatively connected through intermeshing gears 44 and 45 to the shaft 46 of an electric motor M which is bolted to the underneath side of the platform 18.

Referring now to Figs. 3, 4, 6, and 8, the gathering or neck molds 20 each consist of a pair of mold sections 47 which are carried at the outer ends of a pair of arms 48 that are pivoted medially of their ends to the upper portion of the frame 25. The inner ends of the arms 48 are pivoted to a pair of links 49 which are in turn pivoted to a slide member 50 which is mounted for limited sliding movement on the underneath side of an overlying support or steadying arm 51 (Fig. 8) which is secured to the upper portion of the frame 25. The slide member 50 is normally maintained in the extreme position illustrated in Fig. 6 by means of a coil spring 57 and thus it will be seen that the mold sections 47 of the neck mold 20 are normally maintained closed upon each other. Pivotally secured to a bracket 52 formed on the frame 25 is a bell crank lever 53, one end of which is connected to the pivotal point between the links 49 and the slide member 50. The other end of the bell crank lever 53 is pivotally secured to a crank arm 54 which extends radially from the upper end of the hinge pin 27 connecting the adjacent mold units 16. A second radial crank arm 54ᵃ is formed on the lower end of the hinge pin 27, and a cam roller 55 provided on the outer end thereof engages a cam track 56 (Fig. 4) and bears against the same during movement of the mold unit 16 in the path provided for it by the track 17. The cam track 56 is so designed that the sections 47 of the neck molds 20 become closed as the units 16 approach the gathering trough T and assume their charging position at the charging station C. The cam track 56 is also designed so that the sections become opened in the vicinity of a discharging station D to permit the completed articles to be removed from the machine.

The steadying arm 51 projects inwardly of the conveyor 15 and the free end thereof is provided with a roller 58 (Figs. 6 and 8) which travels in an endless cam track 59 that extends around the conveyor system 15 and thus the series of frames 25 which comprise the main body portions of the mold units 16 are maintained in a vertical position. A charging or suction head 60 (Fig. 6), is designed to seal the upper end of the mold cavity during the charge gathering operation. The head 60 is of hollow construction and comprises an upper inverted cup-shaped member 61 and a lower plug member 62 which is threadedly received in and closes the bottom of the upper member 61. The plug member 62 in effect provides a cover plate which is provided with a shallow cavity 63 which forms an extension of the mold cavity. The lower peripheral edge of the plug member 62 is adapted to become seated upon the upper end of the closed mold 20 and form an air tight seal therewith. An annular vacuum groove 64 is formed in the lower side of the plug member 62 and this groove communicates with the mold cavity through an annular vacuum slot 65. The groove 64 communicates with the interior of the hollow head 60 through an annular series of spaced bores 66. The suction head 60 is mounted for swinging movement into and out of operative engagement with the mold sections 47 on the outer end of an arm 67, the inner end of which is rockably mounted upon a horizontal shaft 68 (Fig. 3), the latter being mounted in a bearing 69 supported at the upper end of the frame 25.

The inner end of the arm 67 has formed thereon a segmental bevel gear 75 which meshes with a similar gear 76 formed on the inner end of a crank arm 77 (Fig. 2) which is rockably mounted on a hollow shaft 78 journalled in the steadying arm 51. The free outer end of the crank arm 77 is provided with a cam roller 79 which travels in an endless cam track 80 that extends around the conveyor sytem 15. The cam track 80 is so designed that as the mold units 16 approach the gathering trough T to assume a charging position thereover at the charging station C, the crank arm 77 is moved from the inclined position it assumes in Fig. 8 to the vertical position it assumes in Fig. 6. Thus the charging head 60 is lowered into sealing engagement with the closed mold sections 47 of the neck mold 20.

In order to draw the charge of molten glass into the mold cavity provided between the sections 47, vacuum is applied to the upper end of the cavity by the application of vacuum to the interior of the suction head 60. Toward this end, a vacuum conduit 81 (Figs. 4 and 6) extends through the arm 67, shaft 68, shaft 78 and hollow hinge pin 27. The lower end of the vacuum conduit 81 communicates with the interior of a sliding vacuum shoe 82 which moves with the conveyor 15 and slides over the upper surface of an endless track 83 mounted on the platform 18. Interposed in the track 83 at spaced points therealong, are a plurality of vacuum chests 84 (Figs. 2, 4 and 6) which are connected through branch conduits 85 to a vacuum manifold 86 (Figs. 2 and 6). Each vacuum chest 84 is provided with a vacuum port 87 in the upper region thereof which is normally maintained closed by means of a spring pressed valve 88 from which there projects upwardly above the level of the track 83 a short thrust rod 89. Disposed within the sliding shoe 82 is an elongated presser bar 70 which is substantially coextensive with the shoe. The bar 70 is designed to successively engage the thrust rods 89 provided on the valves 88 as the shoe 82 moves thereover to open the valves and permit vacuum to be applied to the respective suction heads 60 through the vacuum conduit 81 leading thereto.

The admission of sub-atmospheric or vacuum pressure to the interior of the suction head 60 for the purpose of drawing the charge is controlled by means of a spring pressed valve 90 which normally closes a port 91 through which the vacuum is introduced into the head 60 from the conduit 81. In order to periodically open the valve 90, an elongated valve stem 92, which is connected thereto, projects from the suction head 60 and the free end thereof is designed for operative engagement with a train of valve lifting levers 93 mounted upon the crank arm 77, the operation of which is controlled by means of a cam roller 94 designed for engagement with a cam 95 mounted upon the cam track 80.

In order to regulate the degree of vacuum applied to the suction head 60 and thus regulate the height, and consequently the amount, of the charge drawn into the neck mold 20 before the charge is severed from the supply body, an air chamber 96 is provided in the suction head 60. The air chamber 96 communicates through a port 97 (Fig. 5) with the vacuum space provided in the head, and a valve 98 which normally closes the port 97 is provided with a valve stem 99 which is designed for engagement with a train 100 of lifting levers similar to the train 93 of levers, and similarly mounted upon the crank arm 77. The operation of the levers 100 is controlled by means of a cam roller 101 associated with the train 100 which cooperates with a cam 102 carried by the cam track 80. The amount of air admitted to the chamber 96 may be regulated by means of a bleeder port 103 and needle valve mechanism 104.

Referring now to Figs. 4 and 6, it will be seen that the lower edges of the neck molds 20, in moving over the gathering trough T to the gathering position at the charging station C, are slightly elevated from the level of molten glass contained within the trough. In order to effect initial contact between the bottom of the neck mold 20 and the body of molten glass so that, upon application of vacuum to the mold, the charge will be drawn from the body of glass into the mold, a plow 105 which moves with the mold 20 is positioned behind the mold in the path of movement thereof and is adapted to be dipped into the glass, thus causing the glass to well up in front thereof and contact the mold. The plow 105 is mounted upon the free end of a plow arm 106, the other end of which is secured to a rockshaft 107 mounted in a bearing 108 carried by the frame 25 in the upper region thereof. A gear segment 109 secured to the shaft 107 cooperates with a rack 110 and is at intervals rotated thereby. Reciprocation of the rack 110 is effected by means of a sleeve 111 having a lug 110' formed thereon which is connected to the rack 110 by means of a link 111'. The sleeve 111 has a segmental bevel gear 112 formed thereon which meshes with a similar bevel gear 113 formed on the upper end of a sleeve 114 which surrounds the vacuum conduit 81 and extends through the tubular hinge member 27. A crank arm 115 formed on the lower end of the sleeve 114 is provided with a cam roller 116 at the outer end thereof which is designed for engagement with a cam track 117 which controls the operation of the plow 105.

The mold charging operation is effected by the application of vacuum to the suction head 60 in the manner previously described during movement of each neck mold unit 16 over the trough T containing the supply body of molten glass. Movement of the units 16 away from the charging position C and over one end of the trough T brings the lower ends of the molds 20 into engagement with a cut-off knife 120 which severs the excess glass from the gathered mold charges and separates said charges from the supply body. The cut-off knife is secured to the outer end of a knife arm 121 and projects over the edge of the trough T. Its position relative to the trough may be varied by means of a set screw mechanism 122 associated with the arm 121, and thus the point at which the charges are severed from the supply body may be varied.

Upon completion of the mold charging operation, after each mold unit 16 has moved from its charging position and has cleared the edge of the gathering trough T, and while the suction head 60 is still in position on the neck mold 20, a bead forming suction head 125 (Figs. 4, 6 and 8) is brought into engagement with the underneath side of the mold in vertical alignment with the mold cavity. The bead forming head 125 forms a part of the mold unit 16 and consists of an upper ring-like mold-engaging plug member 126 which is threadedly received in a lower ring-like member 127. The upper inner edge of the plug member 126 bears against the underneath side of the closed neck mold 20 as at 128 and forms an air tight seal therewith. The plug member 126 is formed with an annular inwardly extending flange 129 which provides a reduced central opening 130 through the member. The lower ring-like member 127 is provided with a central upstanding tubular portion 131 which projects through the opening 130 and extends thereabove a slight distance. The inner lower edges of the sections 47 of the neck mold 20 are formed with a shallow rounded groove 132 (Fig. 9) which cooperates with a groove 133 formed in the extreme upper and outer edge of the tubular portion 131 of the member 127, and a groove 124 provided in the marginal edge of the annular flange 129 in forming a recess 123 into which the bead b is adapted to be drawn by suction. A slight clearance is provided between the marginal edge of the flange 129 and the tubular portion 131, thus creating a space 119 through which sub-atmospheric pressure may be applied to the bead b. Such drawing of the bead into the space 119 provided by the grooves 132, 133 and 124, results in a transfer of heat from the bead b to the contacting metal surrounding the grooves, thus resulting in a chilling of the bead and its consequent solidification which prevents movement of the charge bodily into the finishing mold 24 upon application of vacuum to the cavity thereof.

In order that the bead forming head 125 may be moved into alignment and engagement with the neck mold 20, the lower member 127 thereof is integrally formed on the outer end of a swinging arm 134, the inner end of which is rockably mounted upon the hollow shaft 78 carried by the steadying arm 51. The arm 134 is of tubular L-shape formation and is provided with a projecting arm 135, the outer end of which carries a cam roller 136 designed for cooperation with an endless cam track 137 that extends around inside the conveyor system 15. The cam track 137 is so designed that as the mold units 16 pass over the edge of the gathering trough T after the charge has been gathered in the neck molds 20, the arm 134 carrying the bead forming head 125 is moved from the position indicated in Fig. 6 and is projected through the open frame 25 of the mold carrying unit 16 (Fig. 4) into operative engagement with the neck mold 20 to the position indicated in Fig. 8.

Vacuum is applied to the interior of the head 125 to draw the bead b into the space 119 provided by the grooves 132, 133 and 124, and toward this end, a vacuum conduit 138 (Fig. 8) extends through the arm 134 and communicates through a port 139 with the vacuum conduit 81 which extends through the hollow shaft 78. The admission of sub-atmospheric or vacuum pressure to the interior of the bead forming head 125 is controlled by means of a spring pressed valve 140 which normally closes a port 141 through which the vacuum is introduced into the head from the conduit 138. In order to periodically open the valve 140, a valve stem 143 which is connected thereto, projects from the head 125 and the free end thereof is designed for operative engagement with a train of valve lifting levers 144, the operation of which is controlled by means of a cam roller 145 designed for engagement with a cam 146 mounted upon the cam track 137.

Immediately after the formation of the bead b the suction head 60 is withdrawn from engagement with the neck mold 20 by the action of the cam track 80 cooperating with the roller 79 in the manner previously described. In its inoperative position, the suction head 60 assumes the position shown in Fig. 8. At this stage of the forming operation, the respective overlying body or finishing mold 24 is moved downwardly into engagement with the neck mold 20.

The mold groups 23, which are radially mounted for revolution about the axis of the central column 22, are supported adjacent the outer periphery of the rotary mold carriage 21. Each sectional body or finishing mold 24 consists of a pair of mold sections 150 which are hinged together and suspended as at 151 from an inverted cup-shaped mold head 152 which is in turn suspended from the lower end of a tubular spindle 153. The upper end of the spindle 153 is rotatably supported in a bearing 154 carried by a support 155 mounted on the mold carriage 21. The spindle 153 is also slidable in the bearing 154 as well as being rotatable therein in order that the body molds 24 may be brought into engagement with the neck molds 20 as will be apparent presently. The bearing 154 is provided with a threaded bushing 156 through which the spindle 153 extends and an upwardly presented shoulder 157 formed on the spindle is designed for engagement with the lower end of the bushing 156 to adjustably limit the uppermost position of the spindle. Mounted on the spindle 153 is a sleeve 158 which is rotatable with the spindle and which is rotatably supported in a bearing 159 carried by the mold carriage 21 at the outer periphery thereof. In addition to being rotatable in the bearing 159, the sleeve 158 is vertically slidable therein. A coil spring 160 surrounds the spindle 153 and bears against an inwardly presented shoulder 161 provided on the inner wall of the sleeve 158 and an outwardly presented shoulder 162 provided on the outer wall of the spindle. Thus the mold supporting head 152 is normally and yieldingly urged into engagement with the lower end of the sleeve 158 in such a manner that the sleeve 158 and spindle 153 occupy the same telescopic position with respect to each other and are rotatably and vertically slidable in unison but are nevertheless capable of independent movement with respect to each other, during which movement the coil spring 160 is compressed. The lower end of the sleeve 158 has integrally formed thereon a pair of downwardly and outwardly diverging arms 163 which are connected to the mold sections 150 of the body molds 24 by means of short links 164. From the above arrangement of parts, it will be seen that relative movement of the sleeve 158 with respect to the spindle 153 will cause the mold sections 150 to become opened against the action of the coil spring 160 by means of which they are normally maintained closed upon each other. As previously stated, the spindle 153 and sleeve 158 are rotatable in unison, and toward this end rotary motion is transmitted from the outer sleeve 158 to the inner spindle 153 through the linkage 163, 164, by means of which the mold sections 150 are opened and closed and also by means of a pin 165 which projects through a slot 166 provided in the sleeve 158. The pin and slot connection 165, 166, in addition to serving as a torque applying connection between the two tubular parts, also serves to limit the extent of relative axial telescopic sliding movement between the same.

The mold sections 150, when closed upon each other as shown in Figs. 2 and 3, provide a mold cavity 167 therebetween. The closed mold 24 is provided with a central opening 168 in the top thereof through which opening subatmospheric pressure is applied to the mold cavity 167 to draw the soft central portion or core of the charge of molten glass from the neck mold 20 into the finishing mold 24. A series of vertically extending vacuum grooves 169 or slots are formed in the inner wall of the mold cavity 167 to permit air contained within the cavity to be evenly evacuated therefrom upon application of vacuum thereto, thus effecting uniform expansion of the charge in the mold. In order to apply vacuum to the mold cavity 167, a vacuum pipe or tube 171 extends through the sleeve 158 and spindle 153, is slidable therein, and projects below the lower end of the latter. A vacuum chest 172 is formed on the lower end of the tube 171 and is designed for sealing contact with the open upper end of the mold 24. The upper end of the vacuum tube 171 extends upwardly through, and is journalled in a head member 176 and is also capable of limited vertical sliding movement in the member 176. The tube 171 is in constant communication with a vacuum chamber 173 provided at the upper end of the central supporting column 22 through a vacuum conduit 174, one section 175 of which is extensible to accommodate the vertical sliding movement of the tube 171. The conduit 174 communicates with a hollow ring-like vacuum manifold 186 which is rotatably mounted on the vacuum chamber 173 and is in constant communication with the interior thereof. The vacuum chest 172 is capable of being retracted into the inverted cup-shaped suspension head 152 and is normally held in such retracted position by means of a coil spring 177 which bears at its upper end against an outwardly presented shoulder 178 formed on the conduit 171 and at its lower end against the inner upwardly presented end of the suspension head 152. A port 179 is provided in the vacuum chest 172 in communication with the axial bore of the tube 171. The admission of vacuum pressure to the vacuum chest 172 is controlled by means of a valve 180 which is adapted to open or close the port 179 and which is provided with a valve stem 181 which extends completely through the tube 171 and projects upwardly thereabove. The valve 180 is normally maintained in its closed position by means of a relatively powerful coil spring 182 which bears at its upper end against a collar 183 mounted on the upper end of the stem 181 and at its lower end against the upper end of the tube 171.

The admission of vacuum pressure to the mold 24 is periodically controlled by means of a bell crank lever 190 one arm of which is adapted to bear against the upper end of the valve stem 181 to depress the same and open the valve 180. The lever 190 is mounted and fulcrumed on the upper end of a bracket 191 carried by the tube 171 and through which the vacuum conduit 174 extends. The other end of the lever 190 engages a cam arm 192 which forms a part of a bell crank lever 193 which is connected to a link and lever instrumentality 194, the operation of which is controlled by means of a cam roller 195 designed for engagement with a cam 196 suitably mounted on the central column 22.

As brought out heretofore, the spindle 153 and sleeve 158, together with the mold 24, are adapted to be rotated about the vertical axis of the spindle during certain phases of the fabricating operations. Toward this end, the upper portion of the sleeve 158 is splined to provide a series of external gear teeth which in effect provide an elongated pinion 197 capable of constant mesh with the outermost gear of a train of gears 198 regardless of the vertical position of the sleeve 158. The innermost gear of the train 198 meshes with a stationary rack 199 suitably mounted on the central column 22. Thus it will be seen that, as the mold carriage 21 rotates about the axis of the central column 22, rotary motion is imparted to the spindles 153 and molds 24 carried thereby through the train of gears 198.

The means for raising and lowering the spindles and molds 24, together with their associated parts, is best illustrated in Fig. 2. Pivotally secured as at 200 to the support 155 is a lever 201, the outer end of which is bifurcated as at 202. The bifurcated portions of the lever 201 are themselves bifurcated as at 203 and these latter bifurcations receive therein a pair of trunnions 204 that project outwardly from diametrically opposed points on a collar 205. The collar 205 is loosely mounted on the upper end of the sleeve 158 and is retained between adjacent flanges 206 formed on the sleeve. The inner end of the lever 201 has a cam roller 207 mounted thereon, which roller is designed for cooperation with an endless cam track 208 which extends around the central column 22 and is supported thereby.

Normally, when the mold units 23 are in their elevated position, the mold sections 150 are maintained in their open position by virtue of the fact that the shoulder 157 formed on the spindle 153 engages the lower edge of the bushing 156, thus arresting upward movement of the spindle 153. Continued upward movement of the sleeve 158 against the action of the coil spring 160 results in an outward pull to the mold sections 150 through the arms 163 and links 164. As the mold units 23 are lowered the shoulder 157 leaves the lower edge of the bushing 156 and the coil spring 160 forces the spindle 153 upwardly relative to the sleeve 158, thus applying a downward and inward thrust to the sections 150 through the arms 163 and links 164 and closing the same upon each other. Further downward movement of the units brings the finishing molds 24 and neck molds 20 into register and sealing engagement while at the same time the vacuum chest 172 is brought into register and sealing contact with the mold 24 by the action of the cam 192, lever 190 and valve rod 181. The relatively powerful coil spring 182 which bears against the upper end of the vacuum pipe or tube 171 prevents the valve from leaving its seat until the chest 172 is registered with the mold in sealing contact therewith.

Conversely, after the articles have been formed in the cooperating neck and finishing molds 20 and 24, and the mold units 23 are elevated, the mold sections 150 become opened to release the formed articles. Toward this end, the nature of the cam track 208 and cam 196 is such that the outer sleeve 158 moves upwardly carrying with it the entire mold unit 23, thus disengaging the bell crank lever 190 and cam arm 192. The relatively powerful coil spring 182 is thus permitted to expand and close the valve 180 while at the same time the spring 177 expands and causes the vacuum chest 172 to be raised from the mold. The outer sleeve 158, upon continued movement upwardly relative to the spindle 153, causes the arms 163 and links 164 to exert an outward and upward pull upon the mold sections 150, thus opening these sections upon each other and releasing the formed article carried thereby.

The cam track 56 which controls the opening and closing movement of the gathering or neck molds 20; the cam track 117 which controls the raising and lowering of the plows 105 out of and into the pool of molten glass contained within the gathering trough T; the cam track 80 which controls the raising and lowering of the charging heads 60 out of and into engagement with the upper ends of the neck molds 20; the cams 95 and 102 which control the admission of sub-atmospheric and atmospheric pressure respectively to the interior of the vacuum heads 60; the cam track 137 which controls the lowering and raising of the bead forming heads 125 out of and into engagement with the lower ends of the neck molds 20; the cam 146 which controls the admission of atmospheric pressure to the interior of the bead forming head 125; the cam track 208 which controls the raising and lowering of the body or finishing molds 24 and consequently their opening and closing movements; and the cam 196 which controls the admission of sub-atmospheric or vacuum pressure to the interior of the finishing molds 24, are all designed and so positioned with respect to either the conveyor system 15 or the central column 22, that certain predetermined functions, the operation of which they control, are carried out in the proper phase and sequence and in synchronous cooperation with each other.

As each mold unit 16, in its endless path of travel around the conveyor system 15, approaches the gathering trough T, an inward bend 210 in the cam track 56 (Fig. 1) causes the camming action of the track on the cam roller 55 to become suspended, thus permitting the mold sections 47 of the mold 20 to close upon each other due to the action of the coil spring 57 operating through the slide member 50 and links 49 in the manner previously described. An inward bend 211 in the cam track 117 in the vicinity of the gathering trough T is engaged by the roller 116 which, upon being forced inwardly, causes the plow 105 to become lowered into contact with the pool of molten glass maintained within the trough T immediately after the plow passes over the edge thereof. Continued movement of the unit 16 in its path causes the glass in the vicinity of the closed neck mold 20 to well up ahead of the plow 105 and contact the lower central opening thereof as clearly shown in Fig. 6. Simultaneously with this operation, an outward bend 212 (Fig. 1) in the cam track 80 moves the cam roller 79 and crank arm 77 outwardly in the manner previously described, thus lowering the suction head 60 into operative engagement with the upper end of the neck mold 20. Immediately thereafter, the cams 95 and 102 which control the application of sub-atmospheric and atmospheric pressure to the suction head 60 are engaged by the rollers 94 and 101 respectively and thus the valves 90 and 98 are opened and the charge of molten glass is drawn into the neck mold, the height of the charge, and consequently its mass, being determined by the needle valve and bleeder port mechanism 103, 104. Continued movement of the unit 16 carries the charge of molten glass to the far edge of the trough T where it comes into contact with the cut-off knife 120 which severs the excess glass from the charge and separates the latter from the supply body. Immediately after the neck mold 20 has cleared the far edge of the gathering trough, a downward bend 213 (Fig. 3) in the cam track 137 causes the roller and arm 135 (Fig. 6) to be swung downwardly, thus swinging the bead forming head 125 into operative engagement with the underneath side of the neck mold 20. Upon contact of the bead forming head 125 and neck mold 20, the roller 145 (Fig. 8) which controls the admission of vacuum pressure to the interior of the head 125 engages the cam 146, thus opening the valve 140 and causing the bead b to be drawn into the space 123 (Fig. 9) provided by the grooves 132, 133 and 124. The surrounding metal of the mold 20 and head 125 chills the bead and prevents its dislodgment from the space 123 upon subsequent expansion of the charge in the finishing mold 24. Immediately after the bead b has been formed, an inward bend 214 (Fig. 1) in the cam track 80 moves the cam roller 79 and crank arm 77 inwardly, thus raising the suction head 60 out of operative engagement with the upper end of the neck mold 20. At this point in the path of movement of the mold units 16, the finishing mold units 23 carried by the rotary mold carriage 21 come into vertical alignment with respective neck molds as the latter in moving around the endless path provided for them, leave the straightaway portion of the conveyor and move into the circular portion thereof in the vicinity of the central column 22. Immediately after the suction head 60 has been moved to its inoperative position, an upward bend 215 (Fig. 1) in the cam track 208 causes the roller 207 to be raised, thus tilting the lever 201 and lowering the rotating finishing mold 24 with which the neck mold 20 is in alignment into operative engagement with the upper end of the neck mold 20. As soon as sealing contact is established between the finishing mold 24 and neck mold 20, the cam roller 195 comes into engagement with the cam 196, thus depressing the tube 171 and the elongated valve stem 181 therein thus opening the valve 180 to permit vacuum pressure to be applied to the vacuum chest 172 and consequently to the interior of the finishing mold 24. Such application of vacuum pressure to the interior of the finishing mold 24 causes the soft central portion or core of the mold charge that has been drawn into the neck mold 20 to be drawn into the rotating finishing mold 24 and expanded into the shape of the finished article.

The cam 196 is of sufficient length that the application of vacuum pressure to the interior of the mold 24 is maintained until the formed article has had sufficient time to become set so that the same is self-supporting. During this time, the cooperating mold units 16 and 23 traverse a major portion of the circular portion of their path of travel around the central column 22. The supply of vacuum to the interior of the mold 24 is discontinued prior to separation of the neck and finishing molds, and toward this end the roller 195 moves out of engagement with the cam 196 which is discontinued at a predetermined point in the path of movement of the roller 195, thus causing the valve 180 to become closed. Immediately thereafter, as the cooperating units 16 and 23 approach the discharging station D, an outward bend 217 in the cam track 56 (Fig. 1) actuates the slide member 50 (Fig. 3) against the action of the coil spring 57, thus opening the sections 47 of the neck mold 20 to release the neck portion of the completely formed article. A downward bend 216 (Fig. 1) in the cam track 208 causes the roller 207 to be lowered, thus tilting the lever 201 (Fig. 2) and raising the rotating finishing mold unit 23 in the manner previously described. Upon elevation of the mold unit 23, the article which has become set remains supported between the closed sections of the mold 24. At the discharging station D, the mold sections 150 are opened in the manner previously described to release the formed article. Simultaneously with the opening of the mold sections 150, a take-out mechanism 218 (Fig. 1) of conventional design which is synchronized with the operation of the conveyor system 15 comes into operation and receives the completed article and deposits the same on a suitable conveyor 219 from whence it is conducted from the apparatus.

After the articles have been discharged from the apparatus at the receiving station D in the manner just described, the finishing mold units 23 carried by the mold carriage 21, in returning to the point or region wherein they become aligned with the neck mold units 16, are conducted over a trough 220 containing water or other cooling medium. An upward bend 221 (Fig. 1) in the cam track 208 causes the roller 207 to be raised, thus tilting the lever 201 (Fig. 2) and lowering the rotating finishing molds below the level of the cooling medium in the trough 220. A downward bend 222 in the cam track 208 restores the molds to their normal elevation.

In the form of the invention just described, proper regulation of the atmospheric and sub-atmospheric pressure to the interior of the suction head 60 to initially draw the charge of molten glass from the gathering trough into the neck mold 20 and proper application of vacuum to the bead forming head 125 is relied upon to insure the formation of a perfect bead at the lower edge of the charge prior to expansion of the charge in the rotating finishing mold. In Figs. 10 and 11, a modified form of bead forming suction head is disclosed by means of which the charge is compacted in the neck mold 20 against the plug member 62 of the suction head 60 during the drawing of the bead, thus insuring not only that an adequate amount of glass shall be supplied to the recess 123 (Fig. 9) to form a perfect bead, but also insuring that a uniform depth of the charge shall be chilled in the region of contact between the charge and the walls of the neck mold prior to expansion of the charge in the finishing mold. In Figs. 10 and 11, the bead forming head 250 consists of an upper ring-like mold engaging plug member 251 which is threadedly received in a lower body member 252. The upper inner edge of the plug member 251 is adapted to bear against the underneath side of the closed neck mold 20 as at 253 and form an air tight seal therewith. The plug member 251 is formed with an annular inwardly extending flange 254 which provides a reduced central opening 255 extending through the member. The lower body member 252 is provided with a central upstanding tubular portion 256 which projects through the opening 255 and extends thereabove a slight distance. Cooperating grooves formed in the adjacent edges of the mold 20, tubular portion 256 and flange 254 provide a recess 257 into which the bead b is adapted to be drawn by suction. A slight clearance 258 is provided between the marginal edge of the flange 254 and tubular portion 256, thus creating a space 260 through which sub-atmospheric pressure may be applied to the bead b.

A cylinder 261 is formed in the lower portion of the body member 252 and a piston 262 having a plunger 263 connected thereto is capable of reciprocation in the cylinder 261. The plunger 263 extends into the space enclosed by the tubular portion 256 and a ram 264 having narrow air passages 259 extending therethrough is mounted on the upper end of the plunger 263. The upper side of the ram 264 is rounded to create a pocket or initial blow opening in the charge during compacting thereof. The space enclosed by the tubular portion 256 is vented to the atmosphere as at 265 in order that the ram 264 may reciprocate freely therein. The cylinder 261 communicates above and below the piston with the interior of the hollow arm 134 through conduits 266 and 267 respectively. A vacuum conduit 268 serves to connect the interior of the hollow arm 134 with the annular space surrounding the tubular portion 256 and thus sub-atmospheric or vacuum pressure is constantly applied to the recess 257 wherein the bead b is formed. A slide valve 269 having a vacuum port 270 and a pair of air vents 271 and 272 therein control the alternate admission of vacuum pressure to opposite sides of the piston 262 as well as controlling the intake or exhaust of atmospheric pressure thereto. The slide valve 269 projects below the body member 252 and a coil spring 273 serves to normally maintain the slide valve 269 in its lowermost position with the vacuum port 263 in communication with the lower conduit 267, thus maintaining the piston 262 and ram 264 in their retracted or lowermost position. A bell crank lever 274 is pivotally secured to a bracket 275 formed on the arm 134 and one end 276 thereof is designed for contact with the lower end of the slide valve 269 to actuate the same. The other end 277 of the lever 274 is connected by means of a train of valve lifting levers 278 to a cam and roller mechanism (not shown) similar to the cam and roller mechanism 145, 146, shown in Fig. 8, by means of which the slide valve 269 is actuated.

The bead forming head 250, being formed on the outer end of the arm 134 which is pivoted for swinging movement about the axis of the hollow shaft 78 (Fig. 8) is capable of being projected through the open frame 25 of the mold unit 16 (Fig. 4) into operative engagement with the neck mold 20 as previously described in connection with the bead forming head 250. The bead forming head 250 assumes its operative engagement with the neck mold 20 with the piston and ram 262, 264, thereof in their retracted position. Immediately thereafter, the slide valve 269 is actuated to bring the vacuum port 270 into register with the conduit 266 and the vent 272 into register with the port 267, thus moving the piston 262 and ram 264 upwardly. Air that would ordinarily be entrapped between the ram 264 and the charge of molten glass contained within the neck mold 20 escapes through the passages 259 and the ram engages the charge and compacts the same against the plug member 62 of the suction head 60 and against the walls of the neck mold 20 thus uniformly distributing the material of the charge and eliminating any existing air bubbles or pockets contained within the same while at the same time causing a uniform chilling of the charge at the surface thereof by direct heat transfer to the enclosing metal areas. During this compacting operation, vacuum is applied to the recess 257 through the conduit 268 and vacuum port 270 so that the bead b is formed and chilled in the manner previously described. Immediately after the bead forming operation, the charge is expanded into the finishing mold 24 and the remainder of the forming operations are carried out in the manner set forth during the previous description of the expanding operation.

Modifications may be resorted to within the spirit and scope of the appended claims.

I claim:

1. In a machine for forming a hollow glass article, a combined gathering and neck mold the cavity of which has a capacity to contain only the volume of glass to be present in the completed article, a body mold, means for delivering a mold charge of molten glass to said gathering and neck mold, means for bringing the two molds into register and contact with each other, and means employing suction exclusively for effecting movement of the central portions of the mold charge relative to the neck mold and into the body mold and simultaneously causing the glass to assume the shape of the body mold cavity while connected to the glass in the gathering and neck mold.

2. In a machine for producing a hollow glass article, a combined gathering and neck mold having a cavity extending entirely therethrough in which a minor portion of the finished article is formed, a removable cover plate for the upper end of the mold, means for bringing the mold into charging contact with a supply body of molten glass, means for applying vacuum to the cavity, charge severing mechanism, means for removing the cover plate, a body mold, means for bringing the molds into register and contact with each other, and means for applying vacuum to the body mold to thereby cause initial and final movements of the central portions of the mold charge into the latter and expand such portions to their final shape.

3. In a machine for forming hollow glass articles, a combined gathering and neck mold, a body mold, means for delivering a mold charge of molten glass to said gathering and neck mold, means for bringing the two molds into register and contact with each other, means employing suction exclusively for effecting movement of the central portions of the mold charge relative to the neck mold and into the body mold and simultaneously causing the glass to assume the shape of the body mold cavity while connected to the glass in the gathering and neck mold, and means for rotating the body mold relative to the gathering and neck mold.

4. In a machine for forming a hollow glass article, a combined gathering and neck mold the cavity of which has a capacity to contain only the volume of glass to be present in the completed article, a body mold, means for delivering a mold charge of molten glass to said gathering and neck mold, means for bringing the two molds into register and contact with each other, means employing suction exclusively for effecting initial movement of the central portions of the mold charge in the neck mold and finally into the body mold and simultaneously causing the glass to assume the shape of the body mold cavity while connected to the glass in the gathering and neck mold, means for rotating the body mold relative to the combined gathering and neck mold, and means for holding the neck mold and glass against relative movement.

5. In a machine for forming hollow glass articles, a combined gathering and neck mold, a body mold, means for delivering a mold charge of molten glass to said gathering and neck mold, means for bringing the two molds into register and contact with each other, suction means for effecting initial movement of the central portions of the mold charge in the neck mold and finally into the body mold and simultaneously causing portions of the glass to assume the shape of the body mold cavity while connected to the glass in the gathering and neck mold, means for rotating the body mold relative to the combined gathering and neck mold, and means for applying vacuum to the neck mold and thereby holding the glass against movement relative to the latter.

6. The method of producing a hollow glass article which consists in gathering a mold charge of molten glass into a hollow mold by suction, bringing a second hollow mold into engagement and register with the first mold and solely through the application of differential pressure to the opposite ends of the mold charge, creating an opening in one end thereof and transferring portions of the glass to the second mold and thereby completing the article solely through the use of suction and effecting relative rotation between the second mold and the completed article.

7. In a machine for forming a hollow glass article, a solid one-piece combined gathering and neck mold the cavity of which has a capacity to contain only the volume of glass to be present in the completed article, a cap plate adapted to close one end of the mold during a charging operation, a partible body mold, suction means for delivering a mold charge of molten glass to said combined gathering and neck mold, means for removing the cap plate and thereafter bringing the two molds into register and contact with each other and means employing suction exclusively for effecting movement of portions of the glass into the body mold and simultaneously therewith causing said portions of the glass to assume the shape of the body mold cavity while connected to the glass in the combined gathering and neck mold.

8. In a machine for forming hollow glass articles, a combined gathering and neck mold having a mold cavity extending completely therethrough, means for bringing the lower end of the mold into charging contact with a supply body of molten glass, a hollow suction head, means for moving said head into sealing contact with the upper end of said mold, said head including a cover plate for closing said upper end of said mold, there being a passage through said plate communicating the interior of said head with the mold cavity, means for applying sub-atmospheric pressure to said head to draw a charge of molten glass into said cavity, means for severing the charge thus drawn from the supply body, means for regulating the degree of sub-atmospheric pressure applied to said head to vary the amount of the charge drawn into said cavity before said severing means becomes operative, means for removing said head from contact with the charged mold, a body mold, means for bringing said body mold into sealing contact with said upper end of the charged neck mold, and means for applying sub-atmospheric pressure to said body mold to draw the central portion of the mold charge into the latter and to expand the same to its final shape.

9. In a machine for forming hollow glass articles, a combined gathering and neck mold having a mold cavity extending completely therethrough, means for bringing the lower end of the mold into charging contact with a supply body of molten glass, a hollow suction head, said head including a cover plate for closing the upper end of said mold, means for moving said head into sealing contact with the upper end of said mold, there being a passage through said cover plate connecting the interior of said head with said mold cavity, means for applying sub-atmospheric pressure to said head to draw a charge of molten glass into said cavity, means for removing said head from contact with the charged mold, a body mold, means for bringing said body mold into sealing contact with said upper end of the charged neck mold, means for applying sub-atmospheric pressure to said body mold to draw the central portion of the mold charge into the latter and to expand the same to its final shape, and means for preventing the outer portion of the mold charge from being drawn into the body mold.

10. In a machine for forming hollow glass articles, a combined gathering and neck mold having a mold cavity extending completely therethrough, means for bringing the lower end of the mold into charging contact with a supply body of molten glass, a hollow suction head, means for moving said head into sealing contact with the upper end of said mold, said head including a cover plate for closing said upper end of said mold, there being a passage through said plate communicating the interior of said head with the mold cavity, means for applying sub-atmospheric pressure to said head to draw a charge of molten glass into said cavity, means for compacting the drawn charge in said cavity against said cover plate, means for removing said head from contact with the charged mold, a body mold, means for bringing said body mold into sealing contact with said upper end of the charged neck mold, and means for applying sub-atmospheric pressure to said body mold to draw the central portion of the mold charge into the latter and to expand the same to its final shape.

11. In a machine for forming hollow glass articles, a combined gathering and neck mold having a mold cavity extending completely therethrough, means for bringing the lower end of the mold into charging contact with a supply body of molten glass, means for drawing a charge of molten glass from the supply body into the mold cavity, means for severing said charge from the supply body, a bead forming head, means for bringing said head into contact with the lower end of the mold, said head and mold providing therebetween a recess surrounding the mold cavity at the lower end thereof, means for applying sub-atmospheric pressure to said head to draw molten glass from the lower peripheral regions of the mold charge into said recess to form a bead, a body mold, means for bringing said body mold into sealing contact with the upper end of said neck mold, and means for applying sub-atmospheric pressure to said body mold to draw the central portion of said charge into the latter and to expand the same to its final shape.

12. In a machine for forming hollow glass articles, the combination with a combined gathering and neck mold provided with a central mold cavity extending completely therethrough, of a bead forming head, means for moving said head into contact with the lower end of said mold, said head comprising a ring-like member having an annular cavity and provided with a central passage communicating with the mold cavity, there being a recess formed in said member providing a mold for a bead, means establishing communication between the recess and the interior of said annular cavity, and means for applying sub-atmospheric pressure to the interior of said annular cavity.

13. In a machine of the character described, in combination, a gathering mold provided with a central mold cavity, means for drawing a charge of molten glass into said cavity to substantially fill the same, a bead forming head movable into engagement with the lower end of the charged mold, said head, together with the mold, providing a recess therebetween into which a portion of said charge is adapted to be drawn and chilled to form a bead, and means for applying sub-atmospheric pressure to said head to draw a portion of said charge into said recess.

14. In a machine for forming hollow glass articles, a combined gathering and neck mold having a mold cavity extending completely therethrough, means for bringing the lower end of the mold into charging contact with a supply body of molten glass, means for drawing a charge of molten glass into the mold cavity, a bead forming and charge compacting head, means for bringing said head into operative contact with the lower end of said mold, said head and mold forming therebetween a recess surrounding the mold cavity at the lower end thereof, a plunger carried by said head adapted to engage and compact the charge in said cavity, means for actuating said plunger, means for applying sub-atmospheric pressure to said head to draw molten glass from the lower peripheral regions of the mold charge into said recess to form a bead, a body mold, means for bringing said body mold into sealing contact with the upper end of said neck mold, and means for applying sub-atmospheric pressure to said body mold to draw the central portion of said charge into the latter and to expand the same to its final shape.

15. The method of forming a hollow glass article which consists in gathering a measured quantity of molten glass into a mold by suction, bringing a second mold into contact and register with one end of said first mold, transferring a portion of the glass of said charge in the peripheral regions thereof to said second mold to form a bead, bringing a third mold into contact and register with the other end of said first mold, and transferring a major portion of the glass remaining in said first mold to said third mold by suction to expand the same to the shape of the finished article.

16. The method of forming a hollow glass article which consists in gathering a measured quantity of molten glass into a mold by suction, forming and chilling a peripheral bead on said charge in said mold, bringing a second mold into contact and register with said first mold, and transferring a major portion of the unchilled glass of said charge to said second mold by suction to expand the same to the shape of the finished article while retaining the chilled bead intact.

17. The method of forming a hollow thin blown glass article which consists in gathering a measured charge of molten glass into a mold by suction and completely filling said mold, bringing a second mold into engagement and register with the first mold, and applying differential air pressure to the charge to move the central portion thereof in the same direction relative to the first mold as during the charging operation and to transfer said central portion to the second mold and to expand said central portion to the shape of the hollow article while causing the outer portion of the charge in the surface region thereof to remain in the first mentioned mold.

18. The method of forming a hollow glass article which consists in delivering a mold charge of molten glass to a mold by suction, bringing a second mold into engagement and register with the first mold and transferring the central portion of the mold charge to the second mold solely by the application of internal differential air pressure to the charge wherein sub-atmospheric pressure is applied to the second mold while causing the outer portion of the charge in the surface region thereof to remain in the first mentioned mold, and simultaneously with and by such transfer and application of sub-atmospheric pressure completing the hollow article.

19. The method of forming a hollow glass article which consists in delivering a mold charge of molten glass to a mold by suction, bringing a second mold into engagement and register with one end of the first mold, bringing a third mold into engagement and register with the other end of the first mold, applying sub-atmospheric pressure to the third mold to draw a small portion of the mold charge thereinto, and transferring the central portion of the mold charge to the second mold solely by the application of internal hydrostatic pressure to the charge while simultaneously retaining the outer surrounding portions of the charge in the surface regions thereof in the first mold by retaining the drawn portion of the charge in the third mold.

20. In a machine for forming a hollow glass article, a combined gathering and neck mold having a mold cavity extending completely therethrough, means for bringing one end of the mold into charging contact with a supply body of molten glass, a suction head, means for moving said head into sealing contact with the other end of the mold, means for applying sub-atmospheric pressure to said head to draw a charge of molten glass into the mold cavity, means for removing said head from contact with the charged mold, a body mold, means for bringing said body mold into sealing contact with said last mentioned end of the charged neck mold, means for applying sub-atmospheric pressure to the body mold to draw the central portion of the mold charge into the latter and expand the same to its final shape, and means for preventing the outer portion of the mold charge from being drawn into the body mold.

21. In a machine for forming hollow glass articles, a combined gathering and neck mold having a mold cavity extending completely therethrough, means for bringing the lower end of the mold into charging contact with a supply body of molten glass, a hollow suction head, means for moving said head into sealing contact with the upper end of the mold, said head including a cover plate for closing said upper end of the mold, there being a shallow cavity in said cover plate designed to form an extension of the mold cavity when said head is in sealing contact with the mold, there being a passage through said plate communicating the interior of said head with the mold cavity, means for applying sub-atmospheric pressure to said head to draw a charge of molten glass into said cavity, means for severing the charge thus drawn from the supply body, means for regulably bleeding the interior of said suction head to atmosphere to vary the amount of the charge drawn into said cavity before the severing means becomes operative, means for removing said head from contact with the charged mold, a body mold, means for bringing said body mold into sealing contact with the upper end of the charged neck mold, and means for applying sub-atmospheric pressure to the body mold to draw the central portion of the mold charge into the latter and expand the same to its final shape.

22. In a machine for forming hollow glass articles, a combined gathering and neck mold having a mold cavity extending completely therethrough, means for bringing one end of the mold into charging contact with a supply body of molten glass, a suction head, means for moving said head into sealing contact with the other end of the mold, means for applying sub-atmospheric pressure to said head to draw a charge of molten glass into said cavity, means cooperating with said head for compacting the charge in the mold, meals for removing said head from contact with the charged mold, a body mold, means for bringing the body mold into sealing contact with the last mentioned end of the charged neck mold, and means for applying sub-atmospheric pressure to the body mold to draw the central portion of the mold charge into the latter and expand the same to its final shape.

23. In a machine for forming hollow glass articles, a combined gathering and neck mold having a mold cavity extending completely therethrough, means for bringing the lower end of the mold into charging contact with a supply body of molten glass, a suction head, means for moving said head into sealing contact with the upper end of the mold, means for applying sub-atmospheric pressure to said head to draw a charge of molten glass into said cavity, means cooperating with said head for compacting the charge in the mold, means for removing said head from contact with the charged mold, a body mold, means for bringing the body mold into sealing contact with the last mentioned end of the charged neck mold, means for applying sub-atmospheric pressure to the body mold to draw the central portion of the mold charge into the latter and expand the same to its final shape, and means for preventing the outer portion of the mold charge from being drawn into the body mold.

24. In a machine for forming hollow glass articles, a combined gathering and neck mold having a mold cavity extending completely therethrough, means for bringing the lower end of the mold into charging contact with a supply body of molten glass, a hollow suction head, means for moving said head into sealing contact with the upper end of the mold, said head including a cover plate for closing the upper end of the mold, there being a shallow cavity in said cover plate designed to form an extension of the mold cavity when said head is in sealing contact with the mold, there being a passage through said plate communicating the interior of said head with the mold cavity, means for applying sub-atmospheric pressure to said head to draw a charge of molten glass into said mold cavity, a charge compacting head including a plunger adapted to engage the charge and force the same against the walls of the shallow cavity to compact the same, a protuberance on said plunger for shaping the charge during the compacting operation, means for actuating said plunger, means for removing said suction head from contact with the mold, a body mold, means for bringing the body mold into sealing contact with said upper end of the neck mold, and means for applying sub-atmospheric pressure to the body mold to draw the central portion of the neck mold charge into the body mold and expand the same to its final shape.

25. In a machine for forming hollow glass articles, a combined gathering and neck mold having a substantially cylindrical mold cavity extending completely therethrough, means for bringing the lower end of the mold into charging contact with a supply body of molten glass, means for drawing a charge of molten glass from the supply body into the mold cavity, means for severing said charge from the supply body, a bead forming head, means for bringing the head into contact with the lower end of the mold, said head and mold providing therebetween an annular recess surrounding the mold cavity at the lower end thereof and of a diameter slightly greater than the diameter of the mold cavity at the extreme lower end thereof, means for applying sub-atmospheric pressure to said head to draw molten glass from the lower peripheral regions of the mold charge into said recess to form a bead, a body mold, means for bringing the body mold into sealing contact with the upper end of the neck mold, and means for applying sub-atmospheric pressure to the body mold to draw the central portion of said charge into the latter and expand the same to its final shape, the formed bead serving to retain the peripheral regions of the charge in the neck mold during the drawing operation.

26. In a machine for forming hollow glass articles, a combined gathering and neck mold having a mold cavity extending completely therethrough, means for bringing the lower end of the mold into charging contact with a supply body of molten glass, means for drawing a charge of molten glass from the supply body into the mold cavity, means for severing said charge from the supply body, a bead forming head, means for bringing said head into contact with the lower end of the mold, the extreme inner lower edge of said mold surrounding said cavity being provided with an annular groove, said groove cooperating with said head to provide an annular recess surrounding the mold cavity at the lower end thereof, means for applying sub-atmospheric pressure to said head to draw molten glass from the lower peripheral regions of the mold charge into said recess to form a bead, a body mold, means for bringing the body mold into sealing contact with the upper end of the neck mold, and means for applying sub-atmospheric pressure to the body mold to draw the central portion of said charge into the latter and expand the same to its final shape, the formed bead serving to retain the peripheral regions of the charge in the neck mold during the drawing operation.

27. In a machine for forming hollow glass containers, a combined gathering and neck mold having a mold cavity extending completely therethrough, means for bringing the lower end of the mold into charging contact with a supply body of molten glass, means for drawing a charge of molten glass from the supply body into the mold cavity, means for severing said charge from the supply body, a bead forming head, means for bringing said head into contact with the lower end of the mold, said head including a ring-like member in which there is formed an annular recess into which a portion of the charge is adapted to be drawn to form a bead, means for applying sub-atmospheric pressure to said head to draw the bead, a body mold, means for bringing the body mold into sealing contact with the upper end of the neck mold, and means for applying sub-atmospheric pressure to the body mold to draw the central portion of the charge into the latter and expand the same to its final shape.

28. In a machine of the character described in combination, a gathering mold provided with a central mold cavity, means for drawing a charge of molten glass into said cavity to substantially fill the same, a bead forming head, means for moving said head into engagement with the lower end of the charged mold, said head providing a mold for a bead, means for applying sub-atmospheric pressure to the head to draw a portion of said charge in said cavity into said bead mold, a body mold having a cavity, means for moving the mold into engagement with the upper end of the charge gathering mold, and means for applying sub-atmospheric pressure to the cavity of the body mold to draw the central portion of the charge into the latter and expand the same to its final shape.

29. In a machine for forming hollow glass articles, a combined gathering and neck mold having a mold cavity extending completely therethrough, means for bringing the lower end of the mold into charging contact with a supply body of molten glass, means for drawing a charge of molten glass from the supply body into the mold cavity, a bead forming and charge compacting head, means for bringing the head into operative contact with the lower end of the mold, said head and mold forming therebetween a recess surrounding the mold cavity at the lower end thereof, means for applying subatmospheric pressure to said head to draw molten glass from the lower peripheral regions of the mold charge into said recess to form a bead, a plunger carried by said head adapted to engage and compact the charge in said cavity after the bead has been formed thereon, pneumatic means for actuating said plunger, a body mold, means for bringing the body mold into sealing contact with the upper end of the neck mold, and means for applying sub-atmospheric pressure to the body mold to draw the central portion of said charge into the latter and expand the same to its final shape.

30. In a machine for forming hollow glass articles, a combined gathering and neck mold having a mold cavity extending completely therethrough, means for bringing the lower end of the mold into charging contact with a supply body of molten glass, means for drawing a charge of molten glass from the supply body into the mold cavity, a bead forming and charge compacting head, means for bringing said head into operative contact with the lower end of the mold, means carried by said head for compacting the charge of molten glass in said mold cavity, means carried by said head for forming a peripheral bead from the glass in the lower peripheral regions of said charge, a body mold, means for bringing the body mold into sealing contact with the lower end of the neck mold, and means for applying sub-atmospheric pressure to the body mold to draw the central portion of said charge into the latter and expand the same to its final shape.

31. In a machine for producing hollow glass articles, a series of combined gathering and neck molds, each mold being provided with a mold cavity extending completely therethrough, means for bringing the lower end of each mold successively into charging contact with a supply body of molten glass, means for drawing a charge of molten glass from the supply body into each mold cavity, a series of finishing mold groups mounted for revolution about a central vertical axis above the level of the neck molds and designed for alignment with respective neck molds; each mold group comprising a vertical sleeve mounted for rotation about its own axis, a tubular spindle disposed within said sleeve and rotatable therewith, a partible sectional finishing mold comprised of sections which are hinged to and suspended from the lower end of said spindle, links connecting each mold section with said sleeve whereby relative axial movement of said spindle and sleeve will cause opening or closing of said mold sections, a vacuum pipe extending through said spindle, the upper end of said pipe communicating with a source of vacuum pressure, the lower end of said pipe being adapted to communicate with the closed finishing mold in sealing contact therewith, a valve seat in said pipe, a valve adapted to cooperate with said seat in closing or opening communication through said pipe, a valve stem connected to said valve and extending through the pipe and projecting from the upper end thereof, spring means normally maintaining said pipe out of communication with the finishing mold, means for lowering the finishing mold into sealing contact with one of the gathering and neck molds with which it is in alignment, and means operable upon revolution of said mold groups about said vertical axis for moving said pipe into communication with the finishing mold and for opening said valve to admit sub-atmospheric pressure to the finishing mold to draw the central portion of the charge contained in the neck mold into the finishing mold and expand the same to its final shape.

32. The method of forming a hollow glass article which consists in gathering a measured quantity of molten glass into a mold by suction, compacting said charge in said mold, bringing a second mold into contact and register with said first mold, and transferring the central portion of the glass of said charge to said second mold by suction to expand the same to the shape of the finished article while simultaneously causing the outer portion of the charge in the surface region to remain in the first mold.

33. The method of forming a hollow glass article which consists in gathering a measured quantity of molten glass into a mold by suction, compacting said charge in the mold, bringing a second mold into contact and register with one end of the first mold, transferring a small portion of the glass of said charge in the peripheral regions thereof to the second mold to form a bead, bringing a third mold into contact and register with the other end of said first mold, and transferring a major portion of the glass remaining in said charge to the third mold by suction to expand the same to the shape of the finished article.

34. In a machine for forming hollow glass articles, a combined gathering and neck mold having a mold cavity extending completely therethrough, means for bringing the lower end of the mold into charging contact with a supply body of molten glass, a hollow suction head, means for moving said head into sealing contact with the upper end of said mold, said head including a cover plate for closing said upper end of said mold, there being a passage through said plate communicating the interior of said head with the mold cavity, means for applying sub-atmospheric pressure to said head to draw a charge of molten glass into said cavity, means for severing the charge thus drawn from the supply body, means for regulating the degree of sub-atmospheric pressure applied to said head to vary the amount of the charge drawn into said cavity before said severing means becomes operative, means for removing said head from contact with the charged mold, a body mold, means for bringing said body mold into sealing contact with said upper end of the charged neck mold, means for applying sub-atmospheric pressure to said body mold to draw the central portion of the mold charge into the latter and to expand the same to its final shape, and means for preventing the outer portion of the mold charge from being drawn into the body mold.

35. In a machine for forming hollow glass articles, a combined gathering and neck mold having a mold cavity extending completely therethrough, means for bringing the lower end of the mold into charging contact with a supply body of molten glass, a hollow suction head, means for moving said head into sealing contact with the upper end of said mold, said head including a cover plate for closing said upper end of said mold, there being a passage through said plate communicating the interior of said head with the mold cavity, means for applying sub-atmospheric pressure to said head to draw a charge of molten glass into said cavity, means for severing the charge thus drawn from the supply body, means for regulating the degree of sub-atmospheric pressure applied to said head to vary the amount of the charge drawn into said cavity before said severing means becomes operative, means for removing said head from contact with the charged mold, a body mold, means for bringing said body mold into sealing contact with said upper end of the charged neck mold, means for applying differential air pressure to the charge in the gathering and neck mold to draw the central portion of the mold charge into the latter and to expand the same to its final shape, and means for preventing the outer portion of the mold charge from being drawn into the body mold.

36. The method of producing a hollow glass article which consists in gathering a mold charge of molten glass into a hollow mold by suction and completely filling it as an initial operation, bringing a second hollow mold into engagement and register with the first mold and solely through the application of differential pressure to the opposite ends of the mold charge, creating an opening in one end thereof and simultaneously therewith and thereby transferring portions of the glass to the second mold and thereby completing the article.

37. The method of producing a hollow glass article which consists in charging a hollow mold with molten glass, bringing a second hollow mold into engagement and register with the first mold and solely through the application of differential pressure to the opposite ends of the glass charge, creating an opening in one end thereof and simultaneously therewith and thereby transferring portions of the glass charge to the second mold and thereby completing the article.

LEONARD D. SOUBIER.